United States Patent Office 3,265,568
Patented August 9, 1966

3,265,568
WAX-WATER EMULSIONS CONTAINING PYRETHRUM IN THE PHASE
Robert H. Salvesen, Clark, George A. Weisgerber, Cranford, and Harry W. Rudel, Roselle, N.J., assignors to Esso Research and Engineering Company, a corporation of Delaware
No Drawing. Filed Mar. 12, 1962, Ser. No. 179,193
1 Claim. (Cl. 167—42)

This invention relates to pesticidal compositions and particularly relates to pesticidal compositions comprising water emulsions of wax and insecticides, which emulsions are effective against crawling and flying insects and other pests.

Pesticidal sprays of essentially water insoluble, oil soluble insecticides have generally comprised an oil carrier containing the insecticide, which mixture may be used alone or may be emulsified into a water diluent. A common method of spraying utilizes aerosol "bombs" which additionally contain a major amount of a suitable propellant. While the least expensive propellant suitable for the intended use is desired, the physical properties of the insecticide and the carrier will sometimes control the choice of propellant. Thus, for the essentially water insoluble insecticides which are preferably contained in an oil carrier, certain inexpensive propellants, such as nitrogen or butane, are precluded for use in aerosol sprays because of their oil solubility, and the utilization of more costly propellants, such as the halohydrocarbons, is necessitated.

Another disadvantage of such oil or oil-water emulsion insecticidal sprays is in conjunction with their use with certain normally liquid insecticides, e.g. pyrethrum. The efficacy of such sprays often proves to be relatively short-lived because of the tendency for the liquid insecticide to volatilize, thereby resulting in a low residual activity, which necessitates repeated spraying and resulting economic losses.

In addition to the above-mentioned general disadvantages of an oil-containing spray, the presence of the oil carrier is often prohibited in certain specific applications, where it may cause damage or irritation to the recipient of the spray. One example of such an application is in the use of insecticides in livestock sprays where the insecticide must be essentially nontoxic to the animals due to the possibility of meat and milk contamination. Among the insecticides which have been found to be particularly useful in such applications include such materials as pyrethrum and its related compounds. These compounds are obtained either by the extraction of pyrethrum flowers (*Chrysanthemum cinerariaefolium*) with a suitable solvent, e.g. kerosene or alcohol or by chemical synthesis using various procedures well known in the art. They are insecticidally active, viscous, liquid esters which normally are insoluble in water but soluble in various other solvents, e.g. oil, which property usually necessitates the use of an oil carrier in any aqueous based spray. The inclusion of the oil carrier, however, often causes extreme irritation to the faces and eyes of the animals when the spray is used to control certain insects which usually infest livestock, e.g. the common "face fly" (*Musca autumnalis*). While certain types of creams and smears have been used to combat such insects, they have generally proved irritating to the cattle, difficult to apply, and relatively ineffective.

It has now been discovered that superior pesticidal compositions which overcome all the above-mentioned disadvantages may be obtained by the incorporation of an insecticide into a petroleum wax carrier and the subsequent formation of a wax-water emulsion. These emulsions, comprising petroleum wax, water and insecticide, wherein the insecticide is contained in the wax phase of the emulsion, may be applied as aerosol sprays or as conventional air sprays. Where they are used as aerosol sprays, the utilization of such inexpensive propellants as nitrogen and butane, while generally precluded with oil containing sprays because of their oil solubility, may be successfully accomplished, thereby enabling a considerable economic saving to be realized.

Additionally, the wax-containing sprays surprisingly promote a substantial increase in insecticidal activity when compared to similar oil containing sprays, which increase in activity enables the frequency of spraying to be reduced, thereby resulting in an economic saving. This enhancement of the insecticidal activity is particularly unexpected since the wax itself possesses extremely little, if any, insecticidal properties.

Furthermore, in those specific applications where a non-irritating spray is required, the wax-containing sprays may be safely applied onto an animal's face and body without the resulting irritation occasioned by conventional oil-containing sprays.

Suitable water base pesticidal emulsion final compositions can contain a major amount of water, about .5 to 10 wt. percent, preferably 1.0 to 4.0 wt. percent wax, about 0.01 to 5.0 wt. percent, preferably 0.05 to 1.0 wt. percent, of insecticide, and about 0.1 to 5.0 wt. percent, preferably 0.5 to 3 wt. percent of at least one emulsifying agent. Optionally, 0.1 to 5.0 wt. percent, preferably 0.5 to 2.0 wt. percent of a synergist may also be incorporated into the wax phase of the emulsion composition to further enhance the insecticidal activity. The choice of such synergist and the amount to be utilized will depend upon the particular insecticide and will be readily apparent to one skilled in the art.

Alternatively, concentrates of the above emulsion compositions may be prepared in order to facilitate handling and storage problems. Suitable concentrates may contain about 0.5 to 10.0 wt. percent of insecticide and may be readily diluted with water to form the final compositions.

The pesticides useful in the present invention will generally be insoluble or sparingly soluble in water and may be of synthetic or natural origin and organic or inorganic in nature. These materials may include synergists and knock-down agents and also those compounds having residual toxicant effects and combinations and mixtures thereof, such as synthetic halogenated, e.g. chlorinated hydrocarbon organic compounds such as chlorinated alicyclic and aromatic hydrocarbons, organic phosphorous compounds, such as functional adducts of thiophosphoric acid esters, organic nitrogen compounds, thiocyanates, natural organic insecticides like pyrethrins with and without synergists such as piperonyl butoxide, sulfoxide, etc., rotenone and their derivatives, etc.

Specific insecticidal toxicants and synergists suitable for use in conjunction with the wax emulsions include carboxylic acid esters like pyrethrins and allethrin, and also cyclethrin, insecticidal thiocyanates, like isobornyl thiocyanoacetate or butoxythiocyano diethylether, piperonyl butoxide, sulfoxide (n-octyl sulfoxide of isosafrole and related compounds), Octacide [n-(2-ethylhexyl) bicyclo (2,2,1) - 5 - heptene - 2,3-dicarboximide], Strobane (polychlorides of camphene, pinene and related terpenes), Perthane (1,1 - dichloro - 2,2 - bis(p - ethylphenyl)ethane), dieldrin (1,2,3,4,10,10-hexachloro-6,7-epoxy-1,4,4a,5,6,7,8,8a - octahydro - 1,4 - endo-exo - 5,8-dimethanonaphthalene and related compounds), heptachlor (1,4,5,6,7,8,8 - heptachloro - 3a,4,7,7a - tetrahydro - 4,7 - methanoindene), malathion (O,O-dimethyl dithiophosphate of diethyl mercaptosuccinate), sesame oil, DDT, methoxychlor (1,1,1 - trichloro - 2,2 - bis(p-methoxyphenyl)ethane), parathion (O,O-diethyl-O-p-nitrophenyl phosphorothioate), benzene hexahydrochloride„ lindane(gamma isomer of 1,2,3,4,5,6-hexachlorocyclohexane), chlordane (1,2,4,5,6,7,8,8, - otcachloro - 4,7-methane-3a,4,7,7a-tetrahydroindene and related compounds). The above chemical toxicants are illustrative insecticides which can be usefully employed in the invention and are not restrictive and are not intended to impose limitations on the toxicants which may be used.

It is also to be understood that the concentrations of the specific toxicants and synergists, or various combinations thereof, to be used will naturally vary within the previously stated ranges depending upon the particular material and the intended use. For instance, pyrethrins, allethrins, and the like are generally used in concentrations of 0.025 to about 0.5%, piperonyl butoxide and the like in the range of about 0.2 to 2%, thiocyanates in the range of about 0.5 to 3%, Strobane, Perthane and the like in the range of about 0.2 to 8%, and so forth. Suitable concentrations may readily be determined by those skilled in the art and the foregoing figures have been listed here primarily for purposes of illustration rather than limitation.

The above insecticides are generally effective against crawling and flying insects which include bedbugs, flies, roaches such as German cockroaches, Periplaneta and oriental roaches, mosquitoes, lice, beetles, weevils, ants, termites, clothes moths, silver fish, carpet beetles, and the like.

The insecticides which have been observed to be particularly effective in combatting the common "face fly" which infests livestock include those having the general structure:

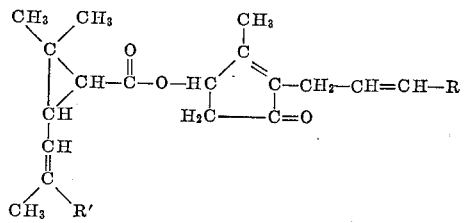

In the above formula, R is selected from the group consisting of hydrogen, —CH=CH$_2$, —CH$_3$ and —C$_2$H$_5$ radicals, and R' is selected from the group consisting of —CH$_3$ and —COOCH$_3$ radicals.

A specific example of the above formula, which was used in the working examples of the invention is the natural occurring material pyrethrum, which contains compounds identified in the art as pyrethrin I, wherein R is —CH=CH$_2$ and R' is —CH$_3$; and pyrethrin II, wherein R is —CH=CH$_2$ and R' is —COOCH$_3$. Pyrethrum is commercially produced by the extraction of the flower head of *Chrysanthemum cinerariaefolium* with a suitable solvent, e.g. petroleum ether, ethylene dichloride, methyl alcohol, acetone, etc. Other examples of suitable insecticides having the above general formula include: cinerin I wherein R is —CH$_3$ and R' is also —CH$_3$; cinerin II, wherein R is —CH$_3$ and R' is —COOCH$_3$; allethrin, wherein R is H and R' is —CH$_3$; etc. These compounds may be chemically synthesized by well known procedures.

The synergists which have been found suitable for use in conjunction with the insecticides of the above structure are well known in the art and include sesamin, 2,6-bis(3,4-methylenedioxyphenyl) - 3,7-dioxabicyclo(3,3,0) octane; piperonyl butoxide, 3,4-methylenedioxy-6-propylbenzyl-n-butyl diethyleneglycol ether; MGK 264, N-(2-ethyl hexyl)bicyclo(2,2,1) - 5-heptene-2,3-dicarboximide; sulfoxide, n-octyl sulfoxide of isosafrole; and n-propyl isome, dipropyl ester of 1,2,3,4-tetrahydro-3-methyl-6,7-methylenedioxy - 1,2-naphthalenedicarboxylic acid. The preferred synergist is piperonyl butoxide.

The waxes useful in the present invention are preferably petroleum waxes derived from distillate fractions of crude oils by such well known processes as chilling, solvent dewaxing, deoiling, "sweating," pressing, etc. These refined petroleum waxes will have a melting point of 110 to 200° F., preferably 125 to 150° F., and a mineral oil content of 0.01 to 10 wt. percent, preferably 0.1 to 2 wt. percent. They may include slack, paraffin, and microcrystalline waxes, with paraffin waxes being especially preferred.

In general, any emulsifying agent, or combination of emulsifying agents, which will cause emulsification of molten wax into water will be suitable for use in the present invention. Among the emulsifying agents found suitable are the fatty and partial esters of aliphatic polyhydric alcohols. These partial esters include the C$_{12}$ to C$_{22}$ fatty acid partial esters of aliphatic polyhydric alcohols having about 3 to 12, e.g. 3 to 8, carbon atoms, and about 2 to 8, e.g. 3 to 6, hydroxy groups per molecule. Preferred materials are the mono- and diesters of C$_3$ to C$_6$ fatty acids. The above type of partial esters includes the partial esters of the mono-dehydrated aliphatic polyhydric alcohols, which are well known in the art, for example, see U.S. Patent 2,434,490, as well as partial esters of non-dehydrated aliphatic polyhydric alcohols, e.g. pentaerythritol monooleate.

Specific examples of the above types of partial esters will include: glyceryl monooleate, pentaerythritol monooleate, sorbitan monooleate, the dioleates of sorbitan, mannitan, pentaerythritol and related polyhydric alcohols, the corresponding partial stearic and palmitic acid esters of these alcohols, and partial esters of these alcohols made from mixtures of these fatty acids.

Partial esters of the above type can be further reacted with alkylene oxide such as ethylene oxide, propylene oxide, etc. to incorporate about 1 to 30 alkoxy groups into each partial ester molecule. Alkylene oxide treated materials of the above type are well known and have been described in detail in U.S. Patents 2,374,931 and 2,380,166. These emulsifiers are available under such trade names as Spans, Tweens, Atloxes, Aldos, Promuls, Surfonics, Tergitols, etc.

Other useful classes of emulsifying agents include the non-ionic and cationic surface active agents. Typical of these emulsifiers are the following: the polyoxyalkene glycols, e.g. polyethylene glycols and polypropylene glycols, alkyl aryl ethers of polyoxyalkene glycols, polyalkyleneoxy disubstituted alkyl amines, alkylated aryl polyether alcohols, etc. These compounds are available under trade names such as Ethomeens, Ethomids, Ethofats, Pluronics, Tritons, Armeens, etc.

Other suitable emulsifying agents include the petroleum sulfonates, aromatic sulfonate-oxide condensate blends, etc., which are available under the trade names: Actos, Agrimulis, Duponols, Emcols, etc.

Various other additives and materials may also be included in the compositions of the present invention to provide additional beneficial results. Examples of such additives include oxidation inhibitors, compatible pesticides, insect repellants, perfumes, etc.

The compositions of the invention are readily prepared by adding the insecticide, the synergist (if desired), and the emulsifying agent or agents to molten wax at a temperature of about 130 to 210° F. with stirring. When these materials have dissolved and formed a clear solution, hot water at about 140 to 180° F. in the desired proportion, is slowly added to the stirred mixture. When the water addition is completed, vigorous agitation by stirring or homogenization is carried out, after which the mixture is allowed to cool to room temperature. The final mixture is a stable emulsion which does not separate upon standing.

The insecticidal compositions of the invention are preferably applied with any conventional spray equipment or may be utilized in aerosol or pressurized sprays with any of the various conventional propellents, including such inert propellents as butane or nitrogen.

The invention may be further illustrated by the following examples which are not intended to limit the invention.

EXAMPLE 1

Two insecticidal compositions were prepared for comparison purposes having the following ingredients and percents by weight. Composition A contained an oil carrier and Composition B contained a wax carrier. Pyrethrum was used as a 20 wt. percent active ingredient concentrate in petroleum distillate.

|  | Composition | |
|---|---|---|
|  | A | B |
| Ingredients, Wt. Percent: | | |
| Pyrethrum (20% concentrate) | 1.2 | 1.2 |
| Piperonyl Butoxide [1] | 2.0 | 2.0 |
| White Oil | 2.0 | |
| Wax | | 2.0 |
| Emulsifier: | | |
| Atlox 1045A [2] | 2.5 | 2.0 |
| Triton B 1956 [3] | 0.1 | 0.1 |
| Water | 92.2 | 92.7 |

[1] Pyrethrum Synergist.
[2] A polyoxyethylene fatty acid derivative, manufactured by Atlas Powder Co.
[3] A modified phthalic glycerol alkyde resin, manufactured by Rohm & Haas Co.

Composition B was prepared by adding pyrethrum, piperonyl butoxide, and emulsifiers to a molten petroleum wax at a temperature of 140 to 150° F. The wax was a paraffin wax having a melting point of 130° F. and contained 0.15 wt. percent mineral oil.

When a clear solution was formed, hot water at a temperature of 135–140° F. was slowly added to the wax solution with stirring, after which the mixture was vigorously agitated. The mixture was then cooled to room temperature and was a light yellow, opaque, stable emulsion.

Composition A was prepared similarly except that the wax was replaced with the oil and the emulsification was performed at room temperature. The oil utilized was a white oil having a viscosity of 12.5 cs. at 100° F.

The two compositions were tested for effectiveness against the common house fly as follows:

Each composition was sprayed with an atomizer onto 6" x 6" panels of untempered masonite almost to the point of fluid run-off, using approximately 12 to 20 mls. of formulation per square foot. After spraying, the various panels were aged for 3, 6 and 16 days. At the end of each particular aging period the respective panels were exposed to 20 house flies caged above and offering voluntary contact with the panels. The mortality rate after 24 hours' exposure was measured as shown in Table I, which represents the average of four determinations for each aging period.

Table I

| Composition | Mortality after 24 hrs. exposure (percent dead) | |
|---|---|---|
|  | A | B |
| Insecticide Carrier | Oil | Wax |
| Age of Test Panel (days after spraying): | | |
| 3 | 48 | 64 |
| 6 | 37 | 52 |
| 16 | 1 | 20 |

As shown in the above table, the wax-containing composition was considerably more effective than the oil-containing composition, particularly for the 16 day aged panel.

The superiority of the wax-containing compositions of the invention in their increased and longer lasting insecticidal activity is, therefore, apparent.

EXAMPLE 2

Actual field testing on dairy cows was performed using the following two compositions. They were prepared by the general procedure and ingredients of Example 1, except that a Crag Fly Repellent was also added to provide further protection against "face flies" (*Musca autumnalis*).

|  | Composition | |
|---|---|---|
|  | C | D |
| Ingredients, Wt. percent: | | |
| Pyrethrum (20% concentrate) | 1.2 | 1.2 |
| Piperonyl Butoxide | 2.0 | 2.0 |
| Crag Fly Repellent [1] | 8.0 | 8.0 |
| White Oil | 2.0 | |
| Wax | | 2.0 |
| Emulsifier: | | |
| Atlox 1045A | 2.5 | 2.5 |
| Triton B 1956 | 0.1 | 0.1 |
| Water | 84.2 | 84.2 |

[1] Butoxy polypropylene glycol, manufactured by Union Carbide Chemicals Co., Div. of Union Carbide Corp.

The compositions were applied as aerosol sprays directly to the heads of test cows which were heavily infested with face flies.

Three typical aerosol formulations are shown below, expressed in percent by weight.

| I | II | III |
|---|---|---|
| 40% Test Composition D | 40% Test Composition D | 70% Test Composition D. |
| 15% Methylene Chloride | 20% Methylene Chloride | |
| 15% Freon-11 [1] | 33% Freon-11 | |
| 30% Freon-12 [2] | 7% Propane | 30% Isobutane. |

[1] Freon-11, trichlorofluoromethane, mfgd. by E. I. du Pont Co.
[2] Freon-12, dichlorodifluoromethane, mfgd. by E. I. du Pont Co.

Fly counts prior to spraying and after spraying were measured by visual observation and were recorded for each cow in test herds of about 20 cows. The spraying was repeated once per day for 14 consecutive days. The percent reduction in fly count was calculated for each spraying and the average results over the test period are shown in Table II together with the average dosage level per cow.

Table II

|  | Composition | |
|---|---|---|
|  | C | D |
| Insecticide Carrier | Oil | Wax |
| Average dosage (grams of composition per cow) | 7.0 | 5.5 |
| Average Percent Reduction in flies | 31 | 53 |

From the above table, it is apparent that the wax emulsion based composition was 22% more effective than the oil emulsion based composition in controlling face flies, even though the dosage level of the wax emulsion was lower than the oil emulsion.

The advantage of the wax emulsion based composition is apparent.

It is understood that this invention is not limited to the specific examples which have been offered merely as illustrations, and that modifications may be made without departing from the spirit of this invention.

What is claimed is:

A method of controlling face flies on the faces of livestock without causing irritation to the eyes of said livestock, which comprises spraying the faces of said livestock with an aerosol bomb comprising a pressurized container; a major amount of a liquefied propellant selected from the group consisting of nitrogen and hydrocarbon; and a minor amount of an insecticidal wax-water emulsion composition suitable for direct application to sensitive areas of said livestock, consisting essentially of a major proportion of water; 0.5 to 10 wt. percent of petroleum wax having a melting point of 110° to 200° F. and a mineral oil content of about 0.01 to about 2.0 wt. percent; 0.01 to 5.0 wt. percent of an insecticide having the structure:

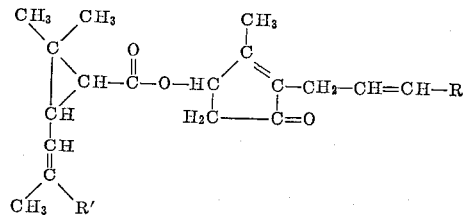

wherein R is selected from the group consisting of H, $-CH=CH_2$, $-CH_3$, and $-C_2H_5$ and R' is selected from the group consisting of $-CH_3$ and $-COOCH_3$; and a small amount of emulsifying agent capable of emulsifying said wax into said water to thereby form said wax-water emulsion, wherein said insecticide is contained within the wax phase of said emulsion.

References Cited by the Examiner

UNITED STATES PATENTS

| | | | |
|---|---|---|---|
| 1,976,780 | 10/1934 | Grant | 167—27 |
| 2,086,479 | 7/1937 | Schrauth | 167—43 X |
| 2,198,991 | 4/1940 | Dutton | 167—43 |
| 2,369,992 | 2/1945 | Treacy | 167—27 |
| 2,566,092 | 8/1951 | Mayfield | 167—42 |
| 2,687,964 | 8/1954 | Kennedy | 167—42 |
| 2,717,262 | 9/1955 | Cole | 167—30 |
| 2,891,889 | 6/1959 | Haynes | 167—13 |
| 2,976,210 | 3/1961 | Cosby | 167—27 |
| 3,008,871 | 11/1961 | Feinberg | 106—15 |
| 3,063,852 | 11/1962 | Doudin et al. | 106—15 |
| 3,095,353 | 6/1963 | Surgant | 167—43 |

FOREIGN PATENTS 210,399   9/1957   Australia.

LEWIS GOTTS, Primary Examiner.

D. MOYER, RICHARD L. HUFF, Assistant Examiners.